Dec. 6, 1960     B. F. HERR ET AL     2,963,387
PRESSURE-SENSITIVE ADHESIVE TAPE AND METHOD OF MANUFACTURE
Filed Dec. 24, 1957
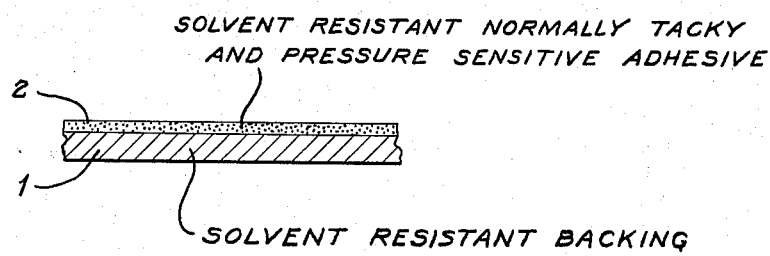
INVENTORS
BENJAMIN FRANK HERR
CYRUS W. BEMMELS
BY
MORGAN, FINNEGAN, DURHAM & PINE
ATTORNEYS United States Patent Office
2,963,387
Patented Dec. 6, 1960

2,963,387

PRESSURE-SENSITIVE ADHESIVE TAPE AND METHOD OF MANUFACTURE

Benjamin Frank Herr, New Brunswick, and Cyrus W. Bemmels, North Brunswick, N.J., assignors, by mesne assignments, to Johnson & Johnson, New Brunswick, N.J., a corporation of New Jersey Filed Dec. 24, 1957, Ser. No. 705,068

4 Claims. (Cl. 117—122)

This invention relates to adhesive compositions and, more particularly, relates to normally tacky and pressure-sensitive adhesive compositions having improved characteristics.

Conventional normally tacky and pressure-sensitive adhesives are compounded from a composition including an elastomeric component, which is usually a natural or synthetic rubber or similar elastomeric polymer, and a solid resinous component compatible with the rubber and adapted to impart tack to the adhesive composition, together with suitable amounts of various types of additives such as conventional fillers, antioxidants etc. The elastomeric component, tackifying resin, and fillers, when used, are proportioned to obtain in the adhesive properties of high internal strength and cohesiveness and high adhesiveness. High cohesive characteristic of the adhesive is required so that the tape with the adhesive shall remain firmly attached to the surface to which it has been applied and not fail because the adhesive is too weak and splits leaving part on the tape and part on the surface to which it was applied. The adhesiveness of the composition must be such that good adherence of the composition to the surface to which it is applied is secured with normal finger pressure.

The adhesiveness of such a composition can be considered threefold in characteristics. In the first instance, the adhesiveness of such a pressure-sensitive composition can be related to the ability of the adhesive to secure itself quickly to the surface to which it is applied. This characteristic can be determined by a procedure which involves touching the adhesive surface of a loop of tape to a suitable surface and measuring the force required to immediately remove the tape from the surface. Such adhesiveness is conventionally expressed as "tack" or "quick stick" in units of grams per unit width of tape. Adhesiveness may be expressed as the force necessary to remove an adhesive coated tape from a surface to which it has been applied. This measurement is called the adhesion or "peel" adhesion. It is generally referred to in oz./inch width when stripped at a rate of 6"/min. The adhesiveness can also be expressed as the characteristic of the adhesive to resist removal of the tape from a surface to which it is applied when subjected to a static load which tends to shear the adhesive mass. In conventional test procedures, this characteristic of a pressure-sensitive adhesive is often determined by suspending a fixed weight from an end of a length of pressure-sensitive tape, a fixed area of the other end of which is adhered to a suitable surface. The weight is suspended in a manner which exerts a shearing force upon the adhesive at a suitable removal angle as, for example, 0°, 20°, 90°, etc. The length of time until the weight drops is taken as an index of an adhesiveness characteristic of the adhesive mass under test and its resistance to shear, and this characteristic is defined as the "hold" characteristic of the adhesive. It is recognized that there is some relation between the internal strength characteristic of an adhesive and its adhesive characteristics, particularly, its hold characteristic. Increased internal strength is generally recognized to have associated with it a related increase in the hold power of an adhesive. It is also generally recognized that the hold characteristic and tack or "quick stick" characteristic are counter-acting properties. That is, the enhancement of one to a great extent, when accomplished, is normally at the expense of the other.

In the electrical industry, electrical grade pressure-sensitive tapes are commonly used to hold wires as well as serve as an insulating barrier in the manufacture of coils, transformers and electric motors. The tapes become an integral and permanent part of the units. Heat curing pressure-sensitive adhesives are very widely used for this application. The adhesive is cured during the normal prebake cycle commonly used to rid the unit of moisture. During the subsequent varnish dip, wax dip, potting or encapsulating operation, a heat cured adhesive remains undissolved, thus providing a continuous bond and no contamination of the dip or potting compounds. Contamination can be a serious problem since it affects the drying and curing properties of the insulating materials and may ruin their properties. Accordingly, a normally tacky and pressure-sensitive adhesive which is resistant to attack by common varnish solvents would be highly useful as the adhesive component of electrical tapes.

The use of oil-soluble reactive phenol-formaldehyde resins to produce heat curing adhesives is known. The heretofore used heat curing adhesives, employing oil soluble rubber reactive phenol-formaldehyde resins in amounts of 10 to 25 parts per 100 parts of rubber, have not been entirely satisfactory because of their slow curing qualities and because of their tendency to revert from an insoluble to a soluble state during long heat cycles at high temperatures of 300° F. and higher. Previous attempts to improve the heat stability and the heat curing properties of the known heat curing adhesives by using larger amounts of curing agent have been unsuccessful since the use of larger amounts of these resins produced a marked drop in the pressure-sensitive or "quick-tack" properties of these adhesives.

Accordingly, it is an object of this invention to provide an adhesive having improved characteristics.

It is an additional object of this invention to provide a normally tacky and pressure-sensitive adhesive having improved characteristics of adhesion and in particular quick-stick and hold characteristics.

It is a further object of this invention to provide a normally tacky and pressure-sensitive adhesive having improved resistance to attack by common varnish solvents and resistance to reversion and which has good storage stability.

Another object of this invention is to provide novel normally tacky and pressure-sensitive tapes utilizing novel adhesive compositions having the attributes set forth in the foregoing objects.

Of the drawings:

The single figure is a cross-sectional view of a pressure-sensitive adhesive tape formed in accordance with the present invention.

In accordance with this invention, pressure-sensitive adhesives having the aforementioned characteristics are formed by incorporating into adhesive compositions a curable elastomeric polymer and a phenol-aldehyde resin made from formaldehyde and a para alkyl phenol in which the alkyl group contains from about 6 to 18 carbon atoms, and preferably in which the alkyl group is highly branched, and curing the resulting mass at elevated temperature for a sufficient period of time to render the mass normally tacky and pressure-sensitive. More particularly, the phenol-aldehyde resin of the type indicated above is in an amount from about 50 to 125 parts per 100 parts by weight of elastomeric polymer. The preferred phenolic resins to be used in this invention are resins prepared from liquid para alkyl phenols containing $C_8$ to $C_{12}$ groups and formaldehyde.

The phenolic resins used in this invention are made by the alkaline condensations of an alkyl phenol of the type indicated hereinbefore with an aldehyde. The ratio of aldehyde to phenol may be from about 0.9 to 2.0 of aldehyde per mole of phenol. The use of more than 2 moles of aldehyde is not desirable since the phenol has only two reactive groups and the excess aldehyde is wasted. Theoretically, more than 1 mole of aldehyde per mole of phenol is needed in order to get a resin with heat curing properties. However, it was found that reacting less than 1 mole of aldehyde per mole of phenol will provide a resin which cures rubber. Presumably, the resin consists of a mixture of unreacted phenol and a phenol-aldehyde resin. The preferred range is 1.1 to 1.5 moles of aldehyde per mole of phenol. The state of condensation of the resin has a bearing on its tack producing and curing properties. The resins of a high state of condensation (preferably solid resins) produce better cures and better pressure-sensitive tack properties than the low molecular weight resins. Likewise the resins with lower aldehyde contents are to be preferred. This is contrary to what would be expected since the methylol content (which is believed to be the rubber reactive group) is actually lower in the high molecular weight resins than in the corresponding low molecular weight counterpart. It is believed this may be due to the improved solubility of the resin in the elastomeric polymer as the methylol content is reduced. Of course this invention is not limited to any theory of action as to what occurs between the phenolic curing agent and the elastomeric polymer.

It has been found that a good means for preparing these resins is to heat the alkyl phenol and para formaldehyde in the presence of a trace of caustic (about 0.01 mole per mole of alkaline material, such as caustic soda) in a one step operation. The trace of caustic does not appear to affect the electrical properties. The reaction may be conveniently carried out under reflux conditions in toluene or a similar suitable solvent. The water resulting from the condensation is decanted from the reflux solvent and serves as a convenient means of measuring the extent of resin condensation.

As indicated heretofore, the adhesive mass is rendered tacky by subjecting it to a limited cure cycle, the phenolic resin present in the mass imparting tack to the adhesive on partial curing thereof. The resulting partially cured tacky mass is partially solvent resistant and possesses good adhesion characteristics such as quick-stick and hold characteristics. As will be well understood by those in the art, the time required will vary depending upon the temperature employed; the higher the temperature the shorter the time period. In general, the adhesive mass is subjected to a limited cure cycle at a temperature in the range of 250 to 400° F. for 1 to 30 minutes or longer cure cycles of 10-24 hours at 180-220° F. A typical cure cycle for a mass including nonyl phenol-formaldehyde resin would be for 5-10 minutes at 335° F. while at a lower temperature such, for example, as 250° F. a curing time of 10-30 minutes may be employed.

Any curable elastomeric polymer or mixture of polymers conventionally used in normally tacky and pressure-sensitive adhesives may be employed in accordance with this invention. Examples of suitable elastomeric polymers for this purpose are isoprene polymers, such as natural rubber, reclaimed rubber, diene-styrene and styrene homolog copolymers, such as butadiene-styrene copolymers containing at least 50% and preferably, at least 70% butadiene; polybutadiene; isobutylene-diene copolymers, such as butyl rubber, an isobutylene-isoprene copolymer; and chloroprene polymers.

Since the adhesive mass is rendered tacky by the limited curing of the phenolic resin, it is not essential that a tackifier be added. If so desired, however, tackifiers may be added to enhance the tackiness of the adhesive mass.

The tackifying resins compatible with such elastomeric polymers which may be employed in this invention may comprise those conventionally employed in the formation of pressure-sensitive adhesives as, for example, rosin, hydrogenated rosin, dehydrogenated rosin, the glycols and glycerides of any of these resinous materials, polyterpenes, coumarone-indene resins, polyalkyl styrenes, and oil-soluble phenol-aldehyde resins. If a tackifying resin is employed it is generally in an amount up to about 45 parts per 100 parts by weight of the elastomer.

The pressure-sensitive adhesive of this invention can be formed in any conventional manner as, for example, by compounding on a conventional rubber mill or Banbury type mixer, dispersing in an internal mixer such as a Baker-Perkins mixer, etc. Preferably the adhesives are formed by milling the elastomer and fillers, if used, with a portion of the tackifying resin and thereafter mixing the formed compound with the solvent and remaining components of the composition to obtain a relatively homogeneous solution of the adhesive.

The formulation may be free of or include, in conventional amounts, fillers such as zinc oxide, magnesium carbonate, calcium carbonate, lead oxide, clay, titanium dioxide, aluminum, hydrated alumina, pulverized glass, silica, etc. Other conventional ingredients for such formulations, such as anti-oxidants or heat stabilizers, dyes or pigments, plasticizers, etc., may be present or absent dependent upon the particular desired use of the adhesive composition.

In carrying out the limited curing cycle, the adhesive may be partially cured in standard Banbury and solvent type mixing equipment, but the preferred method is to cure the adhesive on the tape backing. This cure can be carried out immediately after coating and drying in normal type ovens at relatively high temperatures (usually above 300° F.) and short times (usually less than 1 minute). Cure can also be produced in the roll at low temperatures (usually less than 200° F.) and relatively long times (more than 1 hr.). Intermediate times and temperatures may be used in Festoon type equipment.

In the formation of pressure-sensitive adhesive tapes employing the improved heat curing adhesives of this invention, the adhesive is applied in any suitable manner to any conventional backing for such tapes which will not be deleteriously affected by the curing operation, such as paper, cloth, non-fibrous films (e.g., cellophane, vinyl resins, polyethylene, etc.). As shown in the single figure of the accompanying drawing, the adhesive tape formed comprises a backing 1 and an adhesive coat 2. If desired the backing may be provided with a suitable conventional priming coating to improve the adherence of the adhesive thereto. Suitable primer coatings are those exemplified in the patent to Bemmels 2,647,843, issued August 4, 1953.

The following are examples of normally tacky and pressure-sensitive adhesives and adhesive tapes having improved characteristics and formed in accordance with this invention. It will be appreciated that these formulations are exemplary and the invention should not be construed as limited to the particular materials and proportions listed. Unless otherwise indicated, all proportions recited are in parts by weight.

In the following examples:

"GRS 1022" is a butadiene-styrene copolymer (77:23) manufactured by U.S. Rubber Co.

"Santovar A" is 2,5 ditertiary amyl hydroquinone manufactured by Monsanto Chemical Co.

"Ionol" is 2,6-ditertiary butyl 4 methyl phenol manufactured by Shell Chemical Co.

"Amberol ST 137" is an octyl phenol-formaldehyde resin manufactured by Rohm & Haas.

"Piccolyte S-115" is a terpene resin (polymer of beta pinene) manufactured by Penn. Industrial Chemical Co.

Example I

A 4 mil rope paper impregnated with depolymerized rubber-curing phenolic resin was coated at a coating weight of 1.5 oz./sq. yd. with an adhesive of the following formulation:

| Ingredient: | Parts by weight |
|---|---|
| Milled crude rubber | 30 |
| GRS 1022 | 5 |
| Zinc oxide | 9 |
| Santovar A | 0.5 |
| Ionol | 0.5 |
| Dodecyl phenol formaldehyde resin | 36.5 |

The resulting tape was dried at 120° F. and then cured in an oven about 7 minutes at 300° F.

A comparison of the above uncured and cured samples showed the following:

| | Uncured | Precured |
|---|---|---|
| Adhesion to steel (oz. per in. width) | 41 | 44 |
| Quick-stick | poor | good |
| 20° Hold to Kraft (minutes) (½" x ½" sample 400 gram weight) | 1 | 40 |

Example II

A 4 mil rope paper impregnated with depolymerized rubber-curing phenolic resin was coated at a coating weight of 1.5 oz./sq. yd. with an adhesive of the following formulation:

| Ingredient: | Parts by weight |
|---|---|
| Milled crude rubber | 30 |
| GRS 1022 | 5 |
| Zinc oxide | 9 |
| 0.5 part Santovar A, 0.5 part Ionol | 1 |
| Amberol ST 137 | 21 |
| Piccolyte S-115 | 18 |

The resulting tape was dried at 120° F. and then cured in an oven about 7 minutes at 300° F.

A comparison of the above uncured and cured samples showed the following:

| | Not cured | Precured |
|---|---|---|
| Adhesion to steel (oz. per in.) | 30 | 64 |
| Quick-stick | Poor | Good |
| 20° Hold to Kraft (minutes) | 3 | 48 |

Example III

A 4.5 mil gamma paper impregnated with depolymerized rubber and curing resin impregnant was coated at a coating weight of 2.2 oz. per sq. yd. with an adhesive of the following formulation:

| Ingredient: | Parts by weight |
|---|---|
| Milled crude rubber | 50 |
| Atomite (calcium carbonate) | 29 |
| Santovar A | 1 |
| Amberol ST 137 | 27 |
| Piccolyte S-115 | 23 |

A sample of the resulting tape was cured in an oven by heating from about 300° F. for about seven minutes. Another sample was dried at 120° F. for 10 minutes. A comparison of the cured and uncured samples gave the following results:

| | Not cured | Cured |
|---|---|---|
| Adhesion to steel (oz. per in. width) | 23 | 31 |
| 20° Hold to Kraft (minutes) | 75 | 595 |
| Solvent resistance | None | Insoluble |

Example IV

The following adhesive was coated at a coating weight of 3.5 oz./sq. yd. on 80 x 80 cloth:

| Ingredient: | Parts by weight |
|---|---|
| Pale crepe | 100 |
| Aluminum hydrate | 58 |
| Santovar A | 2 |
| Heat curing resin A* | 53.3 |
| Polyterpene resin (M.P. 115° C.) | 46.7 |

*Heat curing resin A was made in a 1-liter flask equipped with a reflux condenser and decanter. 220.0 g. of nonyl phenol (1 mole) was charged into the flask and 49.5 parts of 91% paraformaldehyde (1.5 moles) was added and 11.0 parts of a 20% Na(OH) solution (0.055 mole) was finally added. The mix was heated and stirred at 90° C. for 2 hours. Then 126.3 g. toluene was added and the solution azeotroped for approximately 2 hours. The final solution viscosity was "L" (Gardner-Holdt scale). Softening range of this resin was 46 8½° C.

Part of the above-described tape was precured in the oven for 1 minute at 340° F.

The quick-stick on both samples was good. The adhesion for the precured sample was 31 oz./in. width and for the uncured sample was 29 oz. The two tapes were aged (accelerated) at 150° F. for six days. After this aging, the unwind adhesion (force necessary to unroll the tape at 150 ft./min.) was 12 oz./in. width for the cured sample and was 150 oz./inch width for the uncured sample. Thus precuring markedly improves the storage stability of the tape.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. A normally tacky and pressure-sensitive adhesive tape having improved "quick-stick," hold, solvent resistant and high temperature stability characteristics, comprising a suitable backing coated on at least one major surface with an adhesive comprising a partially cured elastomeric polymer selected from a group consisting of diene polymers and copolymers, and an elastomeric polymer heat-reacted phenol-formaldehyde resin obtained from a phenol having two reactive groups and wherein the alkyl group of said phenol is a branched chain alkyl containing from about 6 to 18 carbon atoms, said alkyl phenol-formaldehyde resin being in an amount from about 50 to about 125 parts by weight per 100 parts by weight of elastomeric polymer, said composition having been partially cured so as to be normally tacky and pressure-sensitive.

2. A normally tacky and pressure-sensitive adhesive according to claim 1 wherein the alkyl phenol-formaldehyde resin is a para alkyl phenol-formaldehyde resin.

3. The method of manufacturing a normally tacky and pressure-sensitive adhesive tape of improved "quick-stick," hold, solvent resistant and high temperature stability characteristics, which comprises coating on at least one major surface of a suitable backing an adhesive composition comprising a curable elastomeric polymer selected from the group consisting of diene polymers and copolymers, and an alkyl phenol-formaldehyde heat-reactive resin obtained from a phenol having two reactive groups and wherein the alkyl group of said phenol is a branched chain alkyl containing from about 6 to 18 carbon atoms, said alkyl phenol-formaldehyde resin being in an amount from about 50 to about 125 parts per 100 parts by weight of elastomeric polymer, and curing the adhesive mass at an elevated temperature for a sufficient period of time to render it normally tacky and pressure-sensitive.

4. The method of manufacturing a normally tacky and pressure-sensitive adhesive tape according to claim 3 wherein the alkyl phenol-formaldehyde resin is a para alkyl phenol-formaldehyde resin.

References Cited in the file of this patent

UNITED STATES PATENTS

| | | |
|---|---|---|
| 2,476,824 | Albert | July 19, 1949 |
| 2,559,990 | Oace et al. | July 10, 1951 |
| 2,581,926 | Groten et al. | Jan. 8, 1952 |
| 2,657,185 | Young et al. | Oct. 27, 1953 |

FOREIGN PATENTS

| | | |
|---|---|---|
| 649,975 | Great Britain | Feb. 7, 1951 |